(12) United States Patent
Taylor et al.

(10) Patent No.: US 9,256,506 B1
(45) Date of Patent: Feb. 9, 2016

(54) SYSTEM AND METHOD FOR PERFORMING OPERATIONS ON TARGET SERVERS

(71) Applicant: Google Inc., Mountain View, CA (US)

(72) Inventors: Chris Jorgen Taylor, Palo Alto, CA (US); Sanjay Ghemawat, Mountain View, CA (US); Alexander Lloyd, New York, NY (US); Andrew Fikes, Los Altos, CA (US); Yaz Saito, Mountain View, CA (US); Wilson Cheng-Yi Hsieh, Syosset, NY (US); Christopher Cunningham Frost, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 320 days.

(21) Appl. No.: 13/908,996

(22) Filed: Jun. 3, 2013

Related U.S. Application Data

(60) Provisional application No. 61/655,440, filed on Jun. 4, 2012.

(51) Int. Cl.
*G06F 11/30* (2006.01)

(52) U.S. Cl.
CPC .................... *G06F 11/3055* (2013.01)

(58) Field of Classification Search
CPC . G06F 11/2025; G06F 11/2038; G06F 9/505; G06F 9/547
See application file for complete search history.

(56) References Cited

U.S. PATENT DOCUMENTS

| | | | |
|---|---|---|---|
| 2004/0199609 A1* | 10/2004 | Papatla et al. | 709/220 |
| 2005/0193227 A1* | 9/2005 | Nakahara et al. | 714/4 |
| 2009/0164614 A1* | 6/2009 | Christian et al. | 709/223 |
| 2013/0007505 A1* | 1/2013 | Spear | 714/4.11 |

* cited by examiner

*Primary Examiner* — Jigar Patel
(74) *Attorney, Agent, or Firm* — Morgan, Lewis & Bockius LLP

(57) ABSTRACT

A system, computer-readable storage medium storing at least one program, and a computer-implemented method for performing operations on target servers is presented. A request including an operation is received. A set of target servers associated with the operation is identified. The following request processing operations are performed until a predetermined termination condition has been satisfied: a target server in the set of target servers to which the request has not been issued and whose health metrics satisfy health criteria is identified, the request to perform the operation is issued to the target server, and when the request to perform the operation fails at the target server, health metrics for the target server are updated to indicate that the request to perform the operation failed at the target server and health check operation is scheduled to be performed with respect to the target server.

20 Claims, 12 Drawing Sheets

800 ⬊

When the request to perform the operation failed at all of the target servers in the set of target servers

802 — Wait for a predetermined time period to elapse since the request to perform the operation failed at all of the target servers 804 — Repeat the request processing operations

For each target server with respect to which the health check operation is to be performed

902 — Periodically perform the health check operation with respect to the target server to update health metrics for the target server 904 — When the health metrics for the target server satisfy the health criteria, unschedule the health check operation for the target server

1002 — Issue a health check request to the target server

1004 — Determine whether the target server is responding to the health check request 1006 — Update a server availability metric to indicate whether the target server is available or not available

Figure 10

SYSTEM AND METHOD FOR PERFORMING OPERATIONS ON TARGET SERVERS

RELATED APPLICATIONS

This application claims priority to U.S. Provisional Application No. 61/655,440, filed Jun. 4, 2012, entitled "System and Method for Performing Operations on Target Servers," which is incorporated by reference herein in its entirety.

TECHNICAL FIELD

The disclosed embodiments relate generally to performing operations on target servers.

BACKGROUND

In a distributed computing system, a plurality of servers are used to provide load balancing and/or provide low-latency points of access to nearby computer systems. For example, in a distributed storage system, data is replicated in storage clusters that are located across multiple geographical locations. In doing so, the availability of the data is increased and the network proximity of the data to client computer systems is decreased. Typically, when a request to perform an operation in the distributed computing system is received, any one of a number of computer systems in the distributed computer system may service the request. However, the computer systems in the distributed computer system may not always be available to service the requests. Thus, computing resources and time are wasted if a request is issued to a computer system that is not available to service a request.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIG. 8 is a flowchart of a method for handling a request to perform an operation on a target server when the request to perform the operation failed at all of the target servers, according to some embodiments.

FIG. 9 is a flowchart of a method for performing health check operations with respect to target servers, according to some embodiments.

FIG. 10 is a flowchart of a method for performing a health check operation on a target server to update health metrics for the target server, according to some embodiments.

DETAILED DESCRIPTION

Figure 1:
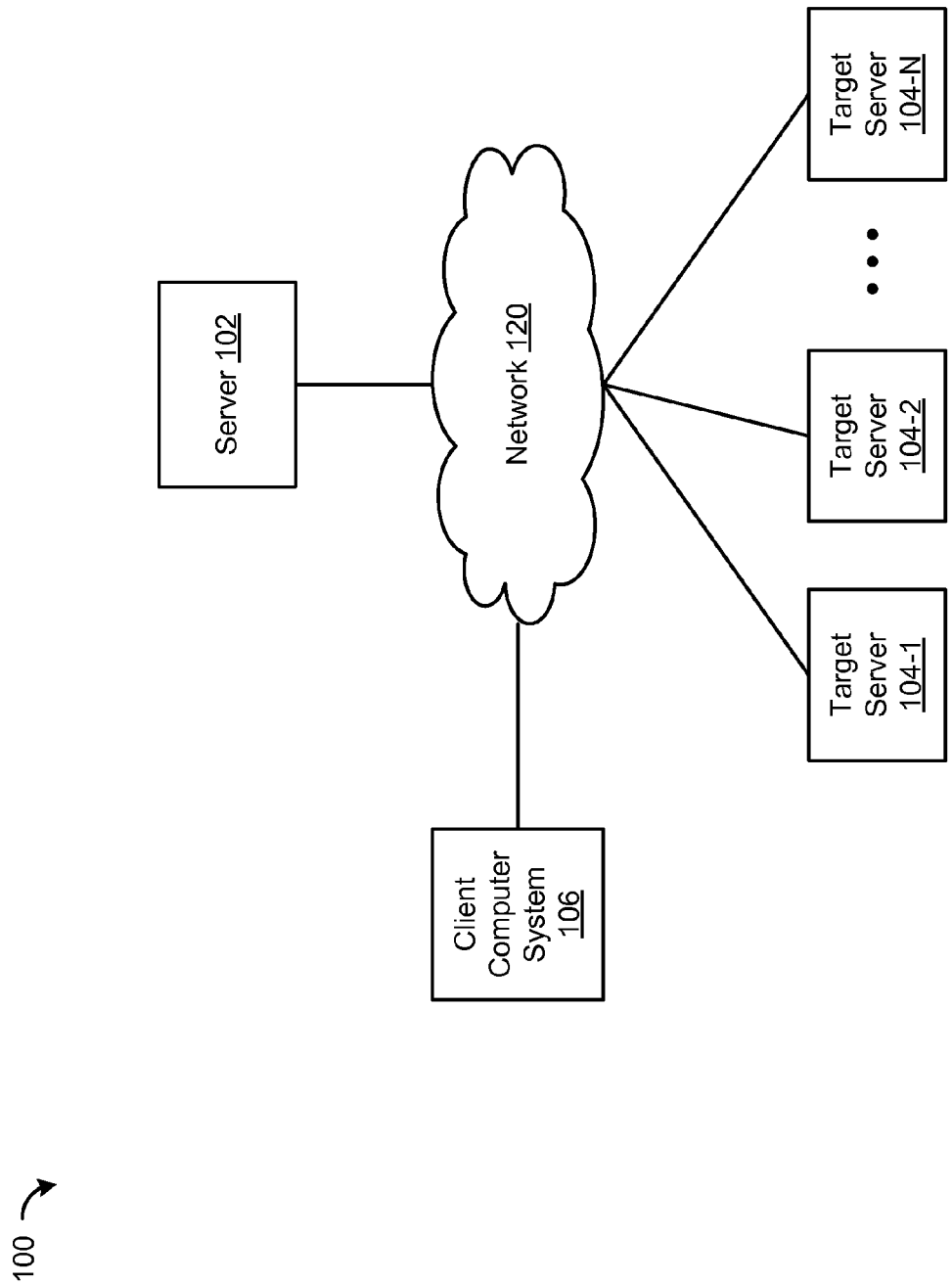
FIG. 1 is a block diagram illustrating a network system, according to some embodiments.

FIG. 1 is a block diagram illustrating a network system 100, according to some embodiments. The network system 100 includes a server 102, a plurality of target servers 104-1 to 104-N, and a client computer system 106 coupled to network 120. In some embodiments, the server 102 issues requests to perform operations to the target servers 104-1 to 104-N. For example, the server 102 may issue a request to the target server 104-1 to perform a read operation to read data stored on the target servers 104-1. In another example, the server 102 may issue a request to perform a write operation to the target server 104-2 write data to the target servers 104-2. Other operations that the server 102 may issue, include, but are not limited to, an operation to delete data stored on a target server, an operation to update data stored on a target server, an operation to perform a search query, and any operations involving data. Note that the term "data" is used in this specification to include any type of data (e.g., binary, text, etc.) and also includes metadata (e.g., data about the data).

In some embodiments, a respective target server is a compute node in a compute cluster of a distributed computing system. Note that a compute node includes one or more computer systems including one or more processors that provides computational resources for other computer systems. In some embodiments, a respective target server is a storage node in a storage cluster of a distributed storage system. In some embodiments, the respective target server is a local server (e.g., in the same data center, the same building, and/or the same geographic location, etc., as the server 102). In some embodiments, the respective target server is a target server (e.g., in a different data center, different building, and/or different geographic location, etc., as the server 102).

In some embodiments, the server 102 is a compute node in a compute cluster of the distributed computing system. In some embodiments, the server 102 is a storage node in a storage cluster of the distributed storage system.

The client computer system 106 includes, but is not limited to, a desktop computer system, a laptop computer system, a smart phone, a mobile phone, a tablet computer system, a server, a game console, a set top box, a television set, and any device that can transmit and/or receive data via network 120.

Network 120 may generally include any type of wired or wireless communication channel capable of coupling together computing nodes. This includes, but is not limited to, a local area network, a wide area network, or a combination of networks. In some embodiments, network 120 includes the Internet.

Note that although FIG. 1 shows one instance of the server 102, multiple servers may be present in the network system 100. For example, the server 102 may include a plurality of distributed servers. Similarly, each of the target servers 104 may represent multiple target servers. For example, the target server 104-1 may include a plurality of distributed servers.

Distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Also note that although the embodiments described herein refer to the server 102, the embodiments may be applied to multiple servers. Furthermore, note that the term "server" and "target server" are relative terms that are interchangeable. In this specification, the term "server" is used to refer to a computer system (e.g., the server 102) that issues an operation to on another computer system (e.g., the target server 104-1, the client computer system 106). Thus, in some instances, the server 102 may be the computer system that issues operations to another computer system (e.g., the target server 104-1). In other instances, the target server 104-1 (or another one of the target server 104-2 to 104-N, the client computer system 106, etc.) may be the computer system that issues operations to another computer system (e.g., the server 102, the target servers 104-2 to 104-N, etc.).

The embodiments described below address the aforementioned deficiencies of existing request processing systems for distributed computing systems.

Figure 2A:
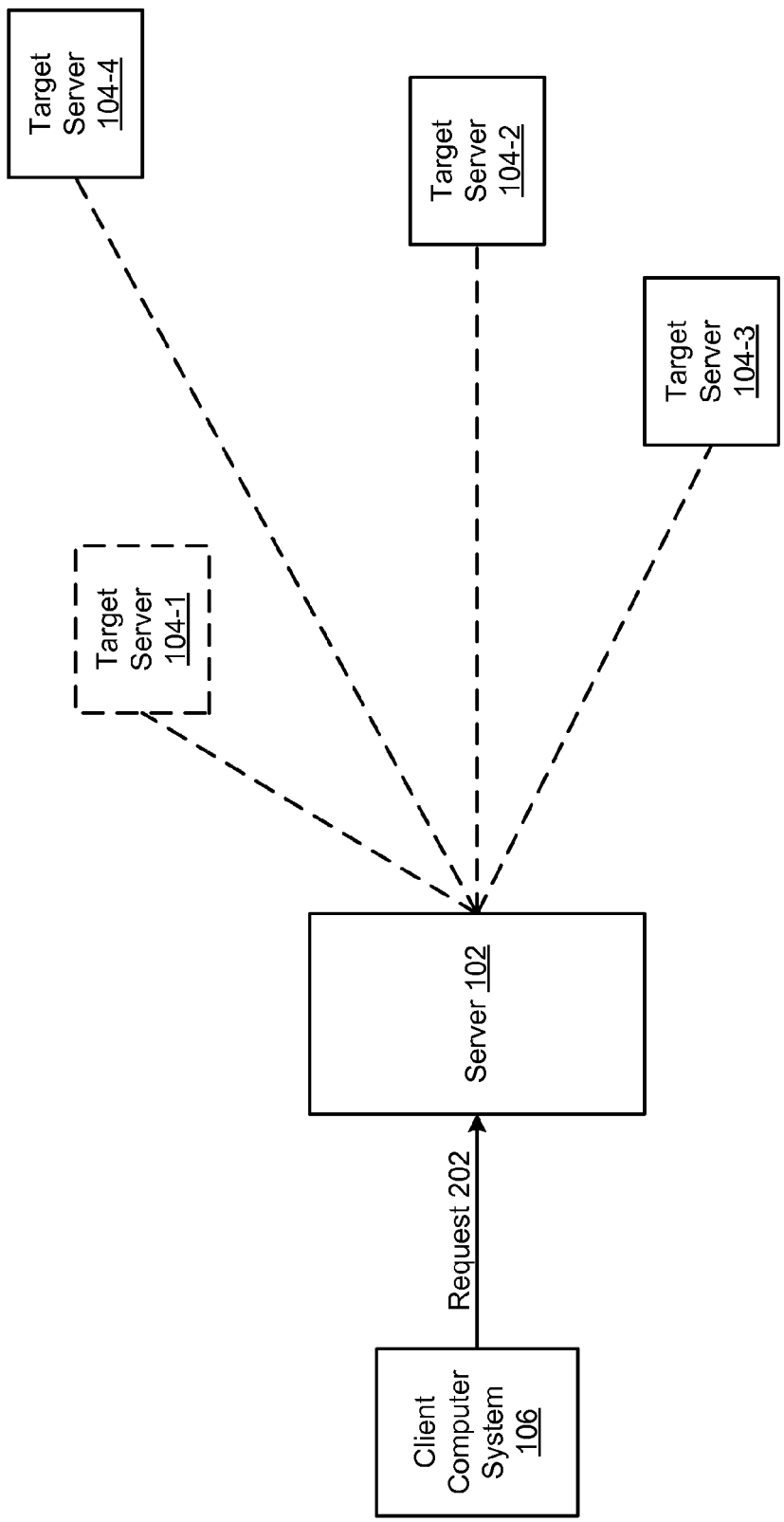
FIG. 2A is a block diagram illustrating an example process for performing an operation on a target server, according to some embodiments.
Figure 2B:
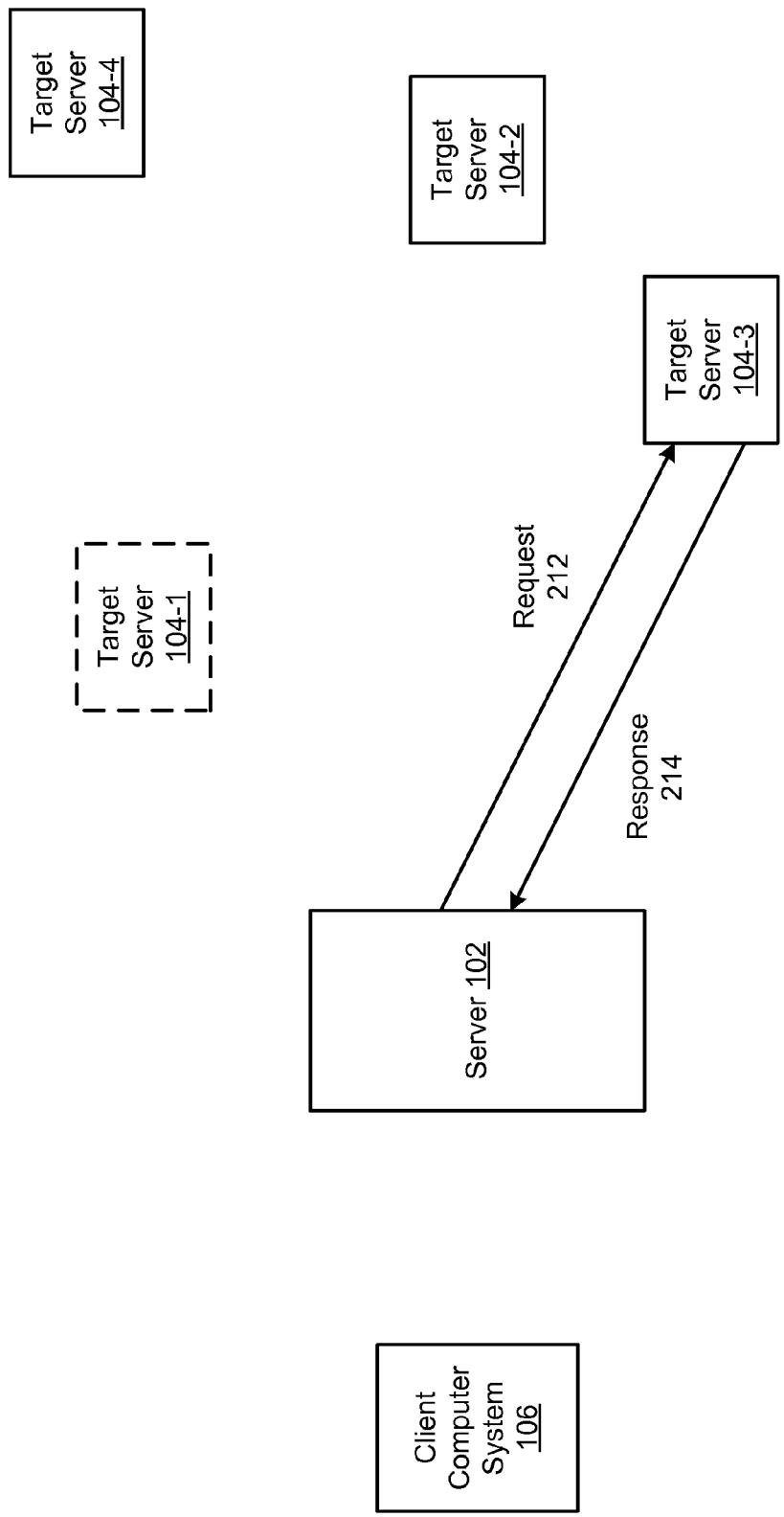
FIG. 2B continues the process illustrated in FIG. 2A, according to some embodiments.
Figure 2C:
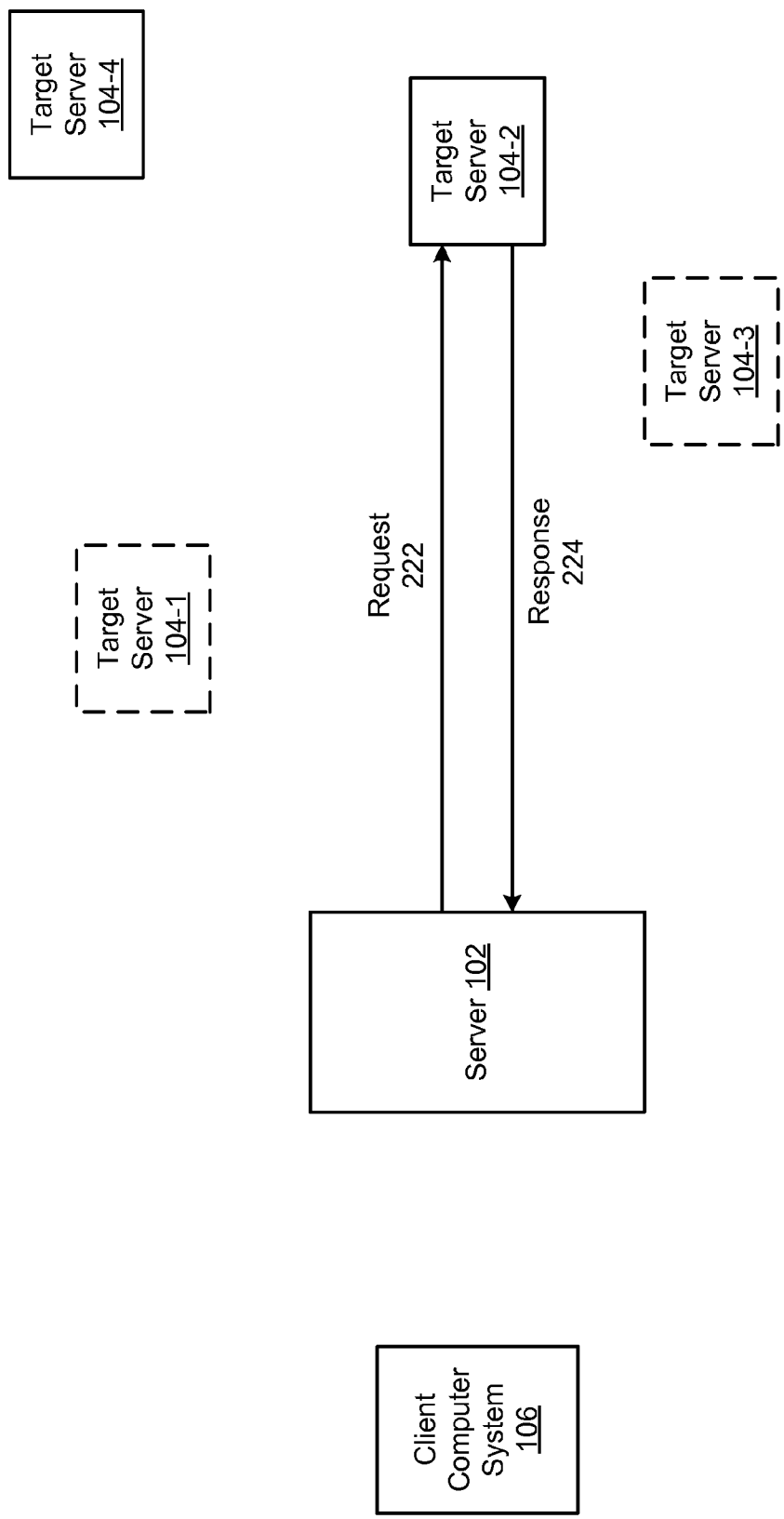
FIG. 2C continues the process illustrated in FIG. 2B, according to some embodiments.

FIGS. 2A-2C are block diagrams illustrating an example process for performing an operation on a target server, according to some embodiments. As illustrated in FIG. 2A, the client computer system 106 issues a request 202 to perform an operation to the server 102. In some embodiments, in response to receiving the request 202, the server 102 identifies a set of target servers associated with the operation. As illustrated in FIGS. 2A-2C, the set of target servers includes the target servers 104-1, 104-2, 104-3, and 104-4.

The server 102 then performs request processing operations until predetermined termination condition has been satisfied. In some embodiments, the predetermined termination condition is satisfied when the request to perform the operation succeeds at one of the target severs in the set of target server. In some embodiments, the predetermined termination condition is satisfied when the request to perform the operation failed at all of the target servers in the set of target servers. In some embodiments, the server 102 performs the request processing operations sequentially with respect to each target server in the set of target servers, as described below with reference to FIGS. 2B and 2C. In some embodiments, the request processing operations include issuing a request to perform the operation to the target servers in the set of target server whose health metrics satisfy health criteria (i.e., a "healthy" target server), updating health metrics for the target servers at which the operation failed, and scheduling health check operations to be performed with respect to the target servers at which the operation failed. These embodiments are described below with reference to FIGS. 2B and 2C.

In some embodiments, the sequence in which the server 102 issues the requests to the target servers in the set of target servers is based on a network proximity between the server 102 and each of the target servers in the set of target servers. For example, the server 102 may issue the requests to the target servers in ascending order of network proximity. In another example, the server 102 may issue the requests to the target servers in descending order of network proximity. In some embodiments, the network proximity between the server 102 and a respective remote server is defined as the network latency between the server 102 and the respective remote server. The network latency is typically measured in terms of time (e.g., milliseconds) and may be affected not only by the physical distance between the server 102 and the respective remote server, but may also be affected by the number of nodes (e.g., routers) between the server 102 and the respective remote server and the speed of the network links between the server 102 and the respective remote server. In some embodiments, the server 102 determines the network proximity between the server 102 and the respective remote server by executing a ping operation to the respective remote server.

In the example illustrated in FIG. 2B, the sequence in which the server 102 issues requests to perform operations on the target servers is based on ascending network proximity. In other words, the server 102 issues the request to perform the operation to the closest target server, then the next closest target server (if necessary), and so on (if necessary). In this example, the sequence in which the server issues the request is as follows: target server 104-1, target server 104-3, target server 104-2, and target server 104-4. However, in this example, the health metrics for the target server 104-1 do not satisfy health criteria. Thus, the server 102 does not issue the request to perform the operation to the target server 104-1 and instead issues a request 212 to perform the operation to the target server 104-3, which is the next nearest target server based on network proximity to the server 102. In response to the request 212, the target server 104-3 transmits a response 214 to the server 102 that indicates that the health metrics for the target server 104-3 do not satisfy health criteria. Note that alternatively, if the server 102 does not receive a response (e.g., the response 214) from the target server 104-3 within a predetermined time period (e.g., a response timeout period), the server 102 may infer that target server 104-3 is not available, and therefore, the health metrics for the target server 104-3 do not satisfy the health criteria.

In some embodiments, health metrics for a respective target server includes at least one of a server availability metric that indicates whether the respective target server is available (e.g., reachable, online, has sufficient memory, has sufficient CPU time, has sufficient network bandwidth, has sufficient storage space, etc.), a pushback metric for a quality-of-service class associated with the request that indicates whether the respective target server rejected the request associated with the quality-of-service class, and a replication delay metric that indicates an estimated amount of time that is required to update the data on the target server to reflect to most-recent version of the data.

In some embodiments, the health metrics for a respective target server satisfies health criteria when the server availability metric for the respective target server indicates that the respective target server is available. In some embodiments, the health metrics for a respective target server satisfies health criteria when the pushback metric for the quality-of-service class associated with the request that indicates that the respective target server did not reject the request associated with the quality-of-service class. In some embodiments, the health metrics for a respective target server satisfies health criteria when the replication delay metric that indicates that an estimated amount of time that is required to update the data on the respective target server to reflect to most-recent version of the data does not exceeds a predetermined amount of time. In some embodiments, the health metrics for a respective target server satisfies health criteria when the replication delay metric that indicates that the respective target server has the most-recent version of the data (e.g., the replication delay metric is zero seconds). In some embodiments, at least two health metrics are used to evaluate whether the health metrics for the respective target server satisfy the health criteria. For example, both the server availability metric and the replication delay metric are evaluated to determine whether the health metrics for the respective target server satisfy their respective health criteria.

Since the request 212 failed to be performed on the target server 104-3, the server 102 updates health metrics for the target server 104-3 to indicate that the request to perform the operation failed at the target server 104-3 and schedules a health check operation to be performed with respect to the target server 104-3. In some embodiments, the health check operation is a background operation that is performed independently of the request processing operations. Assuming (1) that a subsequent request is received by the server 102 that involves the target server 104-3 and (2) that the health check operation either (a) was not performed before the server 102 received this subsequent request involving the target server 104-3 or (b) indicated that the health metrics for the target server 104-3 have not changed since the health metrics for the target server 104-3 were updated to indicate that the request to perform the operation failed at the target server 104-3, the server 102 will not issue the request to the target server 104-3. Instead, the server 102 will issue the first request to perform the operation to the target server 104-2. The health check operation is described in more detail below with reference to FIGS. 3A-3B and 9-12.

Since a predetermined termination condition is not satisfied (e.g., the request to perform the operation has not succeeded at one of the target severs in the set of target servers, the request to perform the operation has not failed at all of the target servers in the set of target servers, etc.), the server 102 issues a request 222 to perform the operation to the target server 104-2, as illustrated in FIG. 2C. In this case, the target server 104-2 is able to perform the operation and transmits a response 224 indicating that the target server 104-2 has performed the operation. In response to receiving the response 224, the server 102 determines that since the request to perform the operation succeeded at the target server 104-2, the predetermined termination condition has been satisfied and the server stops performing the request processing operations.

Note that, in general, the server 102 may receive a plurality of requests from a plurality of client computer systems. In response to receiving the plurality of requests, the server 102 may perform request processing operations to process these requests (e.g., issuing requests to perform operations to the target servers associated with the corresponding requests received from the plurality of client computer systems) in parallel or sequentially. In some embodiments, the health metrics for target servers are cached by the server 102. In these embodiments, the server 102 uses the cached health metrics when deciding to which target server a request is to be transmitted. For example, referring to FIG. 2B, the server 102 may use the cached health metrics to determine that the target server 104-1 is unhealthy and should not be used. When the server 102 updates the cached health metrics for the target servers, the updated health metrics may be used immediately by the server 102 to make decisions as to which target servers to issue a request. For example, after the server 102 determines that the target server 104-3 does not satisfy the health criteria, the server 102 updates the cached health metrics for the target servers to indicate that the health metrics for the target server 104-3 do not satisfy the health criteria, and therefore should not be used. Accordingly, when the server 102 performs request processing operations on a subsequent request received from a client computer system in the plurality of client computer systems that involve the target server 104-3, the server 102 does not issue a request to the target server 104-3, but instead issues the first request to the target server 104-2 (since the health metrics for both the target servers 104-1 and 104-3 do not satisfy the health criteria). In doing so, the server 102 avoids delays in processing the request received from the client computer system by issuing the request to the target servers whose health metrics satisfy the health criteria instead of wasting time issuing requests to one or more target servers whose health metrics do not satisfy health criteria. In some embodiments, when the server 102 has issued two or more requests (e.g., requests issued in parallel, requests issued serially but close in time, etc.) to a target server (e.g., the target server 104-3) and in response to at least one of the requests, the server 102 determines that the health metrics for the target server do not satisfy the health criteria, the server 102 updates the cached health metrics for the target servers to indicate that the health metrics for the target server 104-3 do not satisfy the health criteria, terminates the two or more issued requests, and re-issues the two or more requests to a next target server whose health metrics satisfy the health criteria (e.g., the target server 104-2). In other words, once the server 102 knows that the health metrics for the target server do not satisfy the health criteria, the server 102 does not wait until responses are received from other requests before re-issuing the requests to a target server whose health metrics satisfy the health criteria (e.g., as determined from the cached health metrics for the target servers).

Figure 3A:
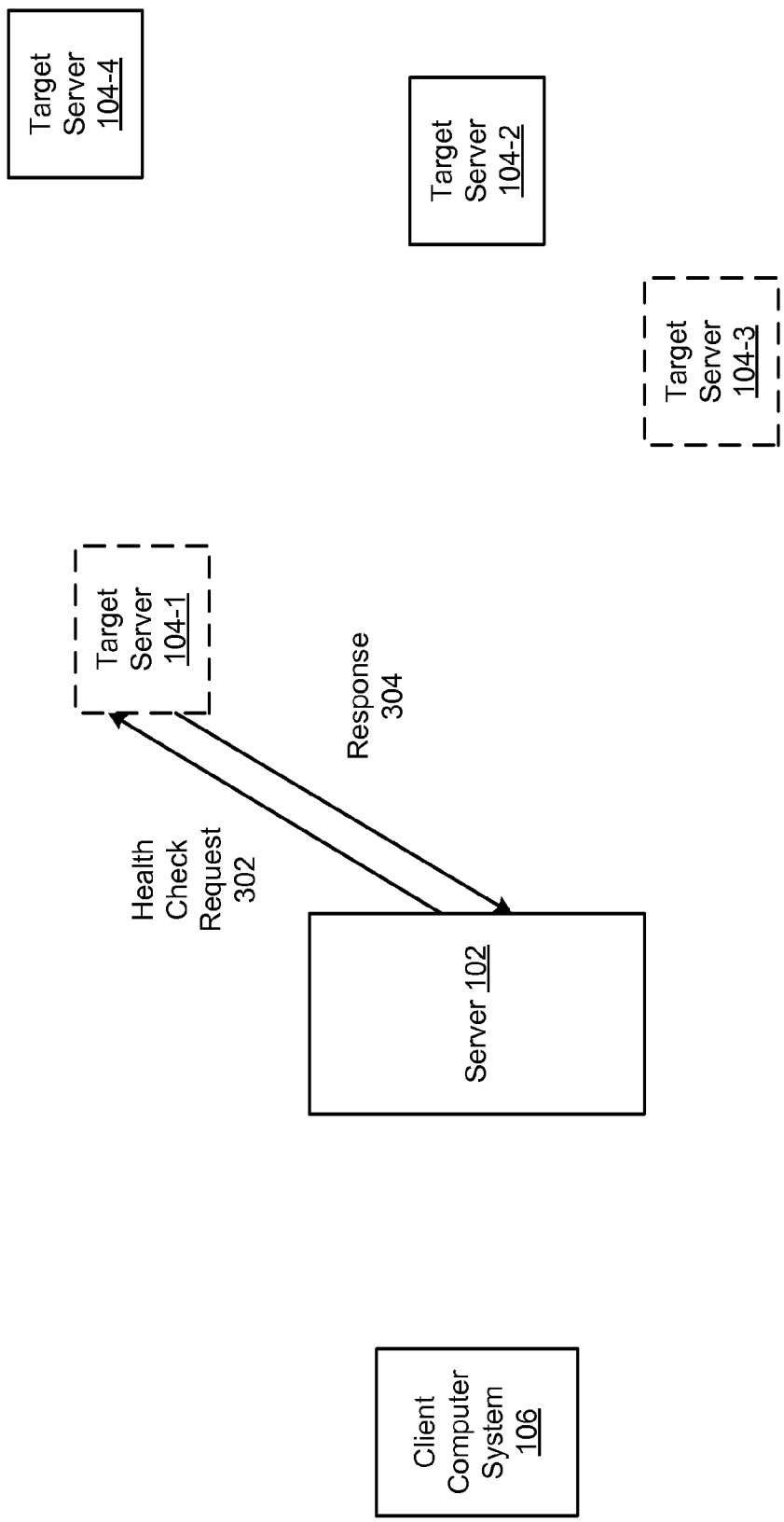
FIG. 3A is a block diagram illustrating an example process for performing a health check operation, according to some embodiments.
Figure 3B:
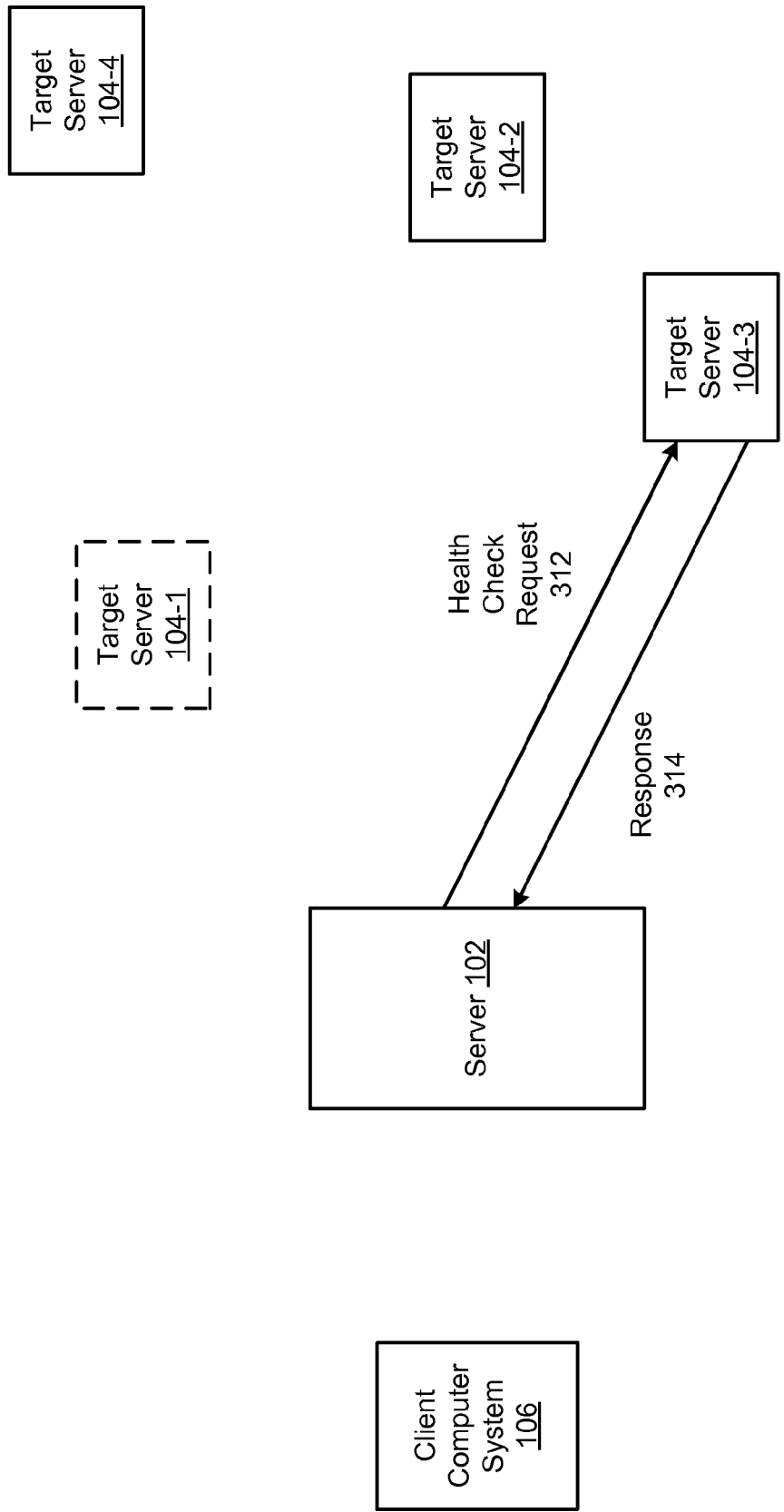
FIG. 3B continues the process illustrated in FIG. 3A, according to some embodiments.

In some embodiments, for each target server with respect to which the health check operation is to be performed, the server 102 periodically performing the health check operation with respect to the target server to update health metrics for the target server. These embodiments are illustrated in FIGS. 3A-3B. In the example illustrated in FIGS. 3A and 3B, the server 102 has previously scheduled heath check operations to be performed with respect to the target servers 104-1 and 104-3. In FIG. 3A, the server 102 issues a health check request 302 to the target server 104-1. In some embodiments, a health check request determines whether a respective target server is available or not. In some embodiments, a health check request determines whether a respective target server sent a pushback signal in response to the health check request. In some embodiments, a health check request obtains an estimated amount of time that is required to update data on a respective target server to reflect a most-recent version of the data. The server 102 receives a response 304 indicating that the health metrics for the target server 104-1 still do not satisfy the health criteria. Note that alternatively, if the server 102 does not receive a response (e.g., the response 304) from the target server 104-1 within a predetermined time period (e.g., a response timeout period), the server 102 may infer that target server 104-1 is not available, and therefore, the health metrics for the target server 104-1 still do not satisfy the health criteria. Since the health check operation is still scheduled for the target server 104-1, during the next iteration of health check operations, the server 102 will issue a health check request to the target server 104-1.

In FIG. 3B, the server 102 issues a health check request 312 to the target server 104-3. The server 102 then receives a response 314 from the target server 104-3 indicating that the health metrics for the target server 104-3 now satisfy the health criteria. Thus, the server 102 unschedules the health check operation for the target server 104-3. Accordingly, during the next iteration of health check operations, the server 102 will not issue a health check request to the target server 104-3. The health check operation is described in more detail below with reference to FIGS. 9-12.

As discussed above with reference to FIGS. 2A-2C, the health metrics for the target servers may be cached by the server 102. Thus, in some embodiments, when the server 102 receives a response to a health check request indicating that the health metrics for a target server satisfy the health criteria, the server 102 updates the cached health metrics for the target server to indicate that the health metrics for the target server satisfy the health criteria. Accordingly, when the server 102 processes subsequent requests involving the target server, the server 102 may once again issue requests to the target server. In other words, the server 102 may start issuing requests to the target server after updating the cached health metrics to indicate that the health metrics for the target server satisfy the health criteria.

Figure 4:
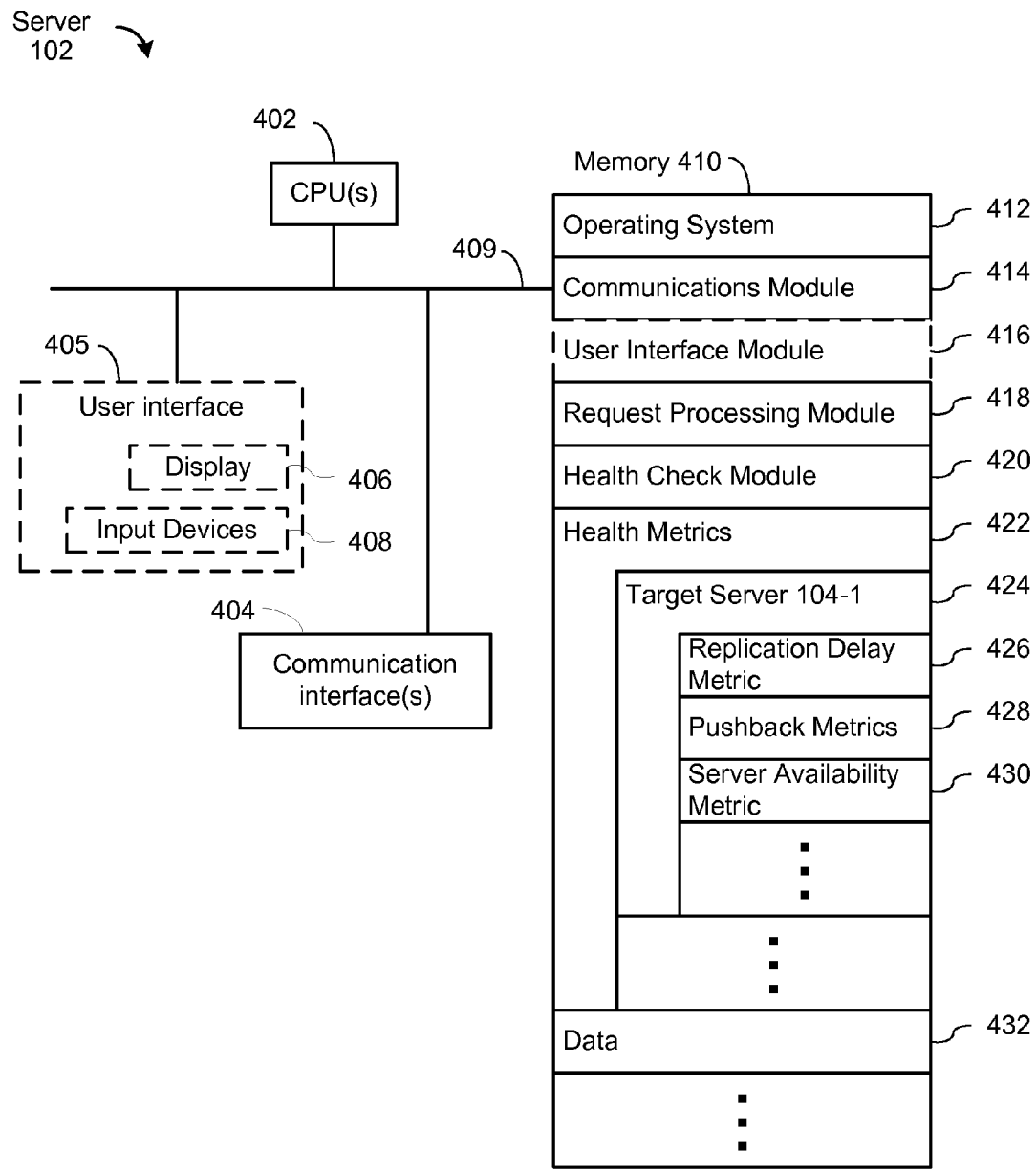
FIG. 4 is a block diagram illustrating a server, according to some embodiments.

FIG. 4 is a block diagram illustrating the server 102, according to some embodiments. The server 102 typically includes one or more processing units (CPU's, sometimes called processors) 402 for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The server 102 optionally includes (but typically does not include) a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:
- an operating system 412 that includes procedures for handling various basic system services and for performing hardware dependent tasks;
- a communication module 414 that is used for connecting the server 102 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- a request processing module 418 that receives requests including operations to be performed and issues requests to perform operations to target servers, as described herein;
- a health check module 420 that performs health check operations with respect to target servers, as described herein;
- health metrics 422 for target servers (e.g., the target servers 104-1 to 104-N) including heath metrics 424 for the target server 104-1, where the heath metrics 424 for the target server 104-1 include at least one of a replication delay metric 426, pushback metrics 428, and a server availability metric 430, etc., as described herein; and
- data 432.

In some embodiments, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 410 stores a subset of the modules and data structures identified above. Furthermore, memory 410 may store additional modules and data structures not described above.

Although FIG. 4 shows a "server," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 5:
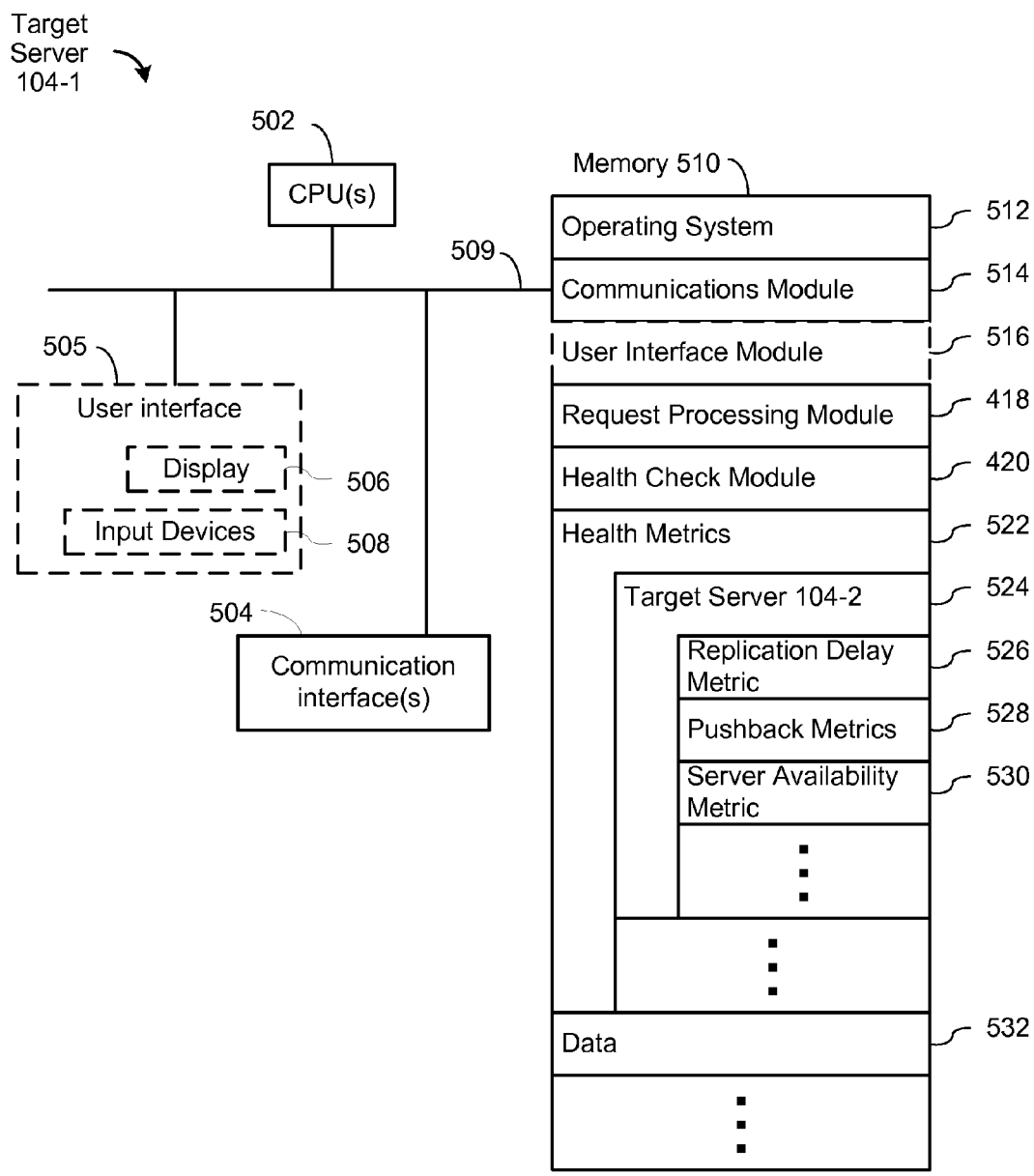
FIG. 5 is a block diagram illustrating a target server, according to some embodiments.

FIG. 5 is a block diagram illustrating the target server 104-1, according to some embodiments. Note that the discussion below may be applied to any of the target servers 104-1 to 104-N. The target server 104-1 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The target server 104-1 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:
- an operating system 512 that includes procedures for handling various basic system services and for performing hardware dependent tasks;
- a communication module 514 that is used for connecting the target server 104-1 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;

the request processing module 418 that receives requests including operations to be performed and issues requests to perform operations to target servers, as described herein;

the health check module 420 that performs health check operations with respect to target servers, as described herein;

health metrics 522 for target servers (e.g., the target servers 104-2 to 104-N, the server 102, etc.) including heath metrics 524 for the target server 104-2, where the heath metrics 524 for the target server 104-2 include at least one of a replication delay metric 526, pushback metrics 528, and a server availability metric 530, etc., as described herein; and data 532.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "target server," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a target server and how features are allocated among them will vary from one implementation to another, and may depend in part on the amount of data traffic that the system must handle during peak usage periods as well as during average usage periods.

Figure 6:
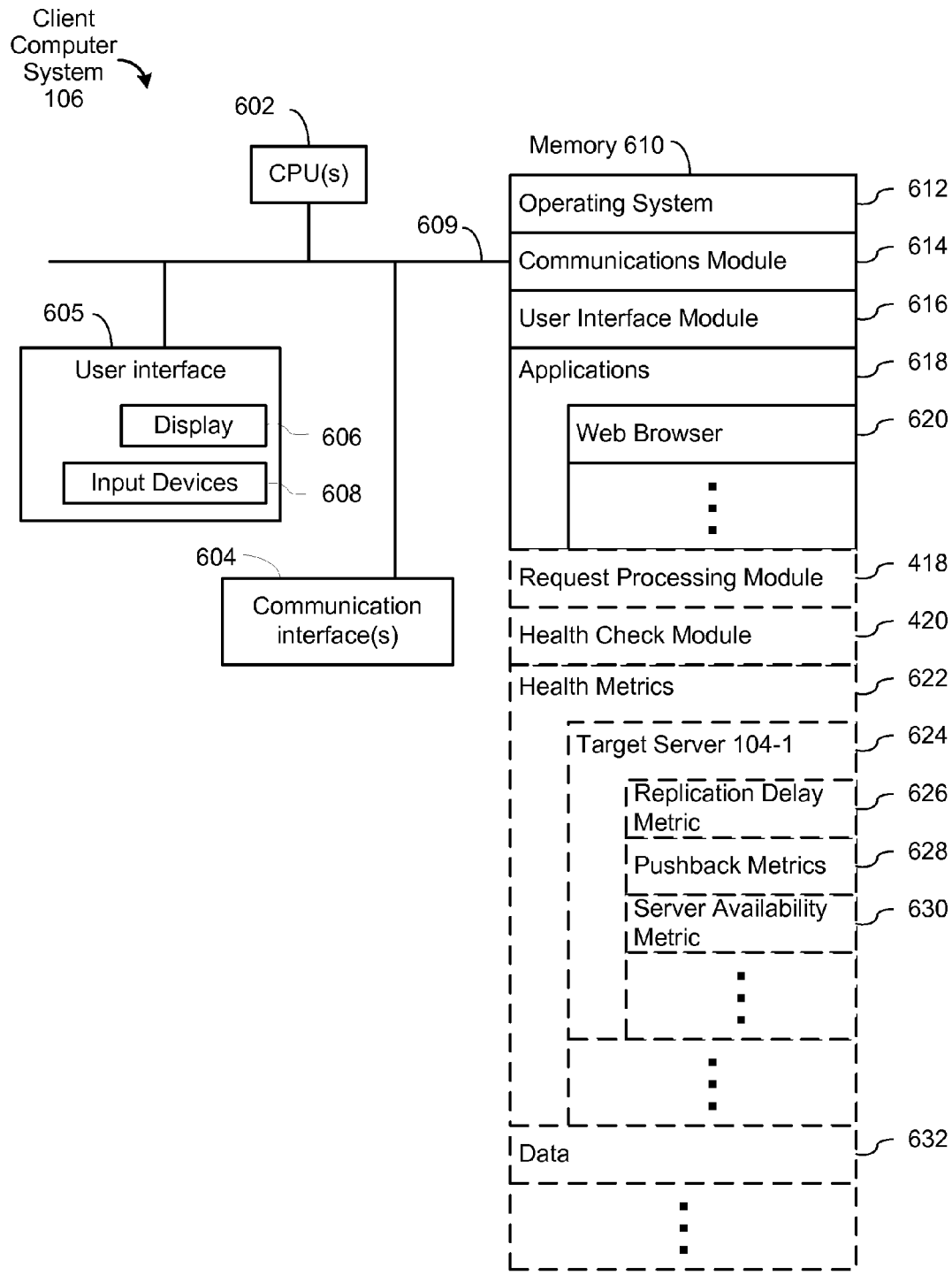
FIG. 6 is a block diagram illustrating a client computer system, according to some embodiments.

FIG. 6 is a block diagram illustrating the client computer system 106, according to some embodiments. The client computer system 106 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The client computer system 106 includes a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

an operating system 612 that includes procedures for handling various basic system services and for performing hardware dependent tasks;

a communication module 614 that is used for connecting the client computer system 106 to other computers via the one or more communication interfaces 604 (wired or wireless) and one or more communication networks, such as the Internet, other wide area networks, local area networks, metropolitan area networks, and so on;

a user interface module 616 that receives commands from the user via the input devices 608 and generates user interface objects in the display device 606;

applications 618 including a web browser 620;

the request processing module 418 that receives requests including operations to be performed and issues requests to perform operations to target servers, as described herein;

the health check module 420 that performs health check operations with respect to target servers, as described herein;

health metrics 622 for target servers (e.g., the target servers 104-1 to 104-N, the server 102, etc.) including heath metrics 624 for the target server 104-1, where the heath metrics 624 for the target server 104-1 include at least one of a replication delay metric 626, pushback metrics 628, and a server availability metric 630, etc., as described herein; and data 632.

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "client computer system," FIG. 6 is intended more as functional description of the various features which may be present in a client computer system than as a structural schematic of the embodiments described herein. In practice, and as recognized by those of ordinary skill in the art, items shown separately could be combined and some items could be separated.

Issuing Operations to be Performed

Figure 7:
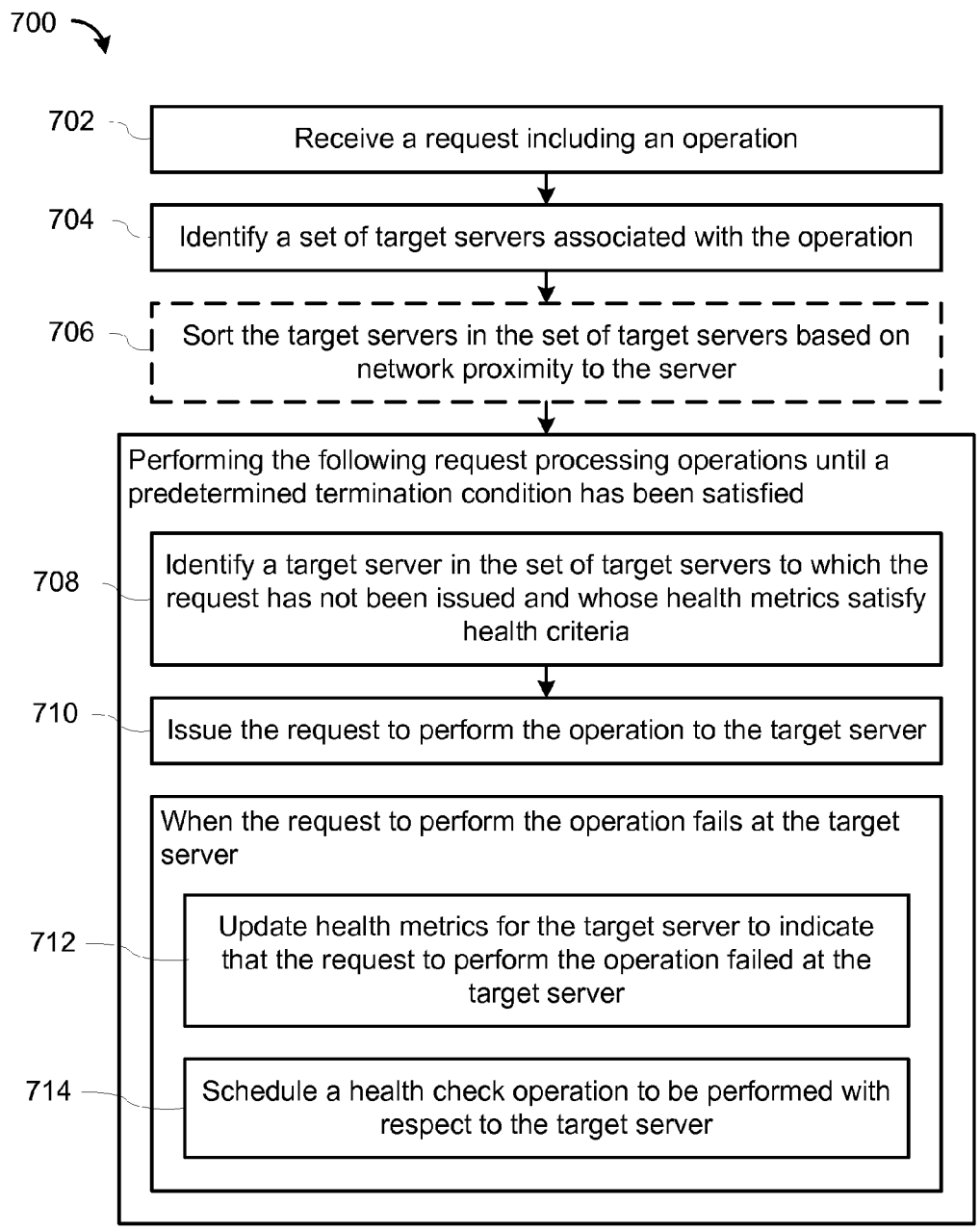
FIG. 7 is a flowchart of a method for performing operations on target servers, according to some embodiments.

FIG. 7 is a flowchart of a method 700 for performing operations on target servers, according to some embodiments. The request processing module 418 receives (702) a request including an operation (e.g., a read operation, a write operation, a delete operation, an update operation, an operation to perform a search query, etc.). In some embodiments, the operation is to be performed by at least one target server.

The request processing module 418 then identifies (704) a set of target servers associated with the operation. For example, if the operation is a read operation, the request processing module 418 identifies the set of target servers that include the data requested in the read operation. In another example, if the operation is a write operation, the request processing module 418 identifies the set of target servers to which the data included in the write operation may be written.

In some embodiments, the request processing module 418 sorts (706) the target servers in the set of target servers based on network proximity to the server 102. For example, the target servers in the set of target servers may be sorted in ascending order based on network proximity to the server 102.

The request processing module 418 performs the following request processing operations until a predetermined termination condition has been satisfied. The request processing module 418 identifies (708) a target server in the set of target servers to which the request has not been issued and whose health metrics satisfy health criteria and issues (710) the request to perform the operation to the target server. For example, assume that the set of target servers includes the target servers 104-1, 104-2, 104-3, 104-4, and 104-5, that the health metrics for the target servers 104-1 and 104-2 do not satisfy the health criteria, and that the request processing module 418 has already issued a request to the target server 104-5 during an iteration of the request processing operation for the set of target servers. In this example, the request processing module 418 can only identify one of two target servers to which the request has not been issued and whose health metrics satisfy health criteria: the target server 104-3 and the target server 104-4.

In some embodiments, health metrics for a respective target server includes at least one of: a replication delay metric indicating an estimated amount of time, since a time when a last health check operation was performed with respect to the respective target server, that is required to update data on the respective target server to reflect a most-recent version of the data, a respective pushback metric for a respective quality-of-service class indicating whether the respective target server was issuing pushback signals for requests associated with the respective quality-of-service class based on load generated by requests associated with the respective quality-of-service class on the respective server during the last health check operation performed with respect to the respective target server, and a server availability metric indicating whether the respective target server was available or not during the health check operation performed with respect to the respective target server.

In some embodiments, the health metrics for a respective target server is stored on the server 102.

Continuing with the discussion of the request processing operations, when the request to perform the operation fails at the target server, the request processing module 418 updates (712) health metrics for the target server to indicate that the request to perform the operation failed at the target server and schedules (714) a health check operation to be performed with respect to the target server. In some embodiments, when the request to perform the operation failed at the target server because the target server was not available, the request processing module 418 updates a server availability metric of the target server to indicate that the target server is not available. In some embodiments, when the request to perform the operation failed at the target server because the target server issued a pushback signal for the request, the request processing module 418 updates a pushback metric of the target server for a quality-of-service class associated with the request to indicate that the target server rejected the request associated with the quality-of-service class. In some embodiments, when the request to perform the operation failed at the target server because data associated with the operation to be performed on the target server is not a most-recent version of the data, the request processing module 418 updates a replication delay metric of the target server to indicate an estimated amount of time that is required to update the data on the target server to reflect to most-recent version of the data. Note that the request processing module 418 may update multiple health metrics when the when the request to perform the operation failed at the target server failed due to multiple of multiple factors.

In some embodiments, the predetermined termination condition is satisfied when the request to perform the operation succeeds at one of the target severs in the set of target server. In some embodiments, the predetermined termination condition is satisfied when the request to perform the operation failed at all of the target servers in the set of target servers.

FIG. 8 is a flowchart of a method 800 for handling a request to perform an operation on a target server when the request to perform the operation failed at all of the target servers, according to some embodiments. The request processing module 418 waits (802) for a predetermined time period to elapse since the request to perform the operation failed at all of the target servers and repeats (804) the request processing operations. In other words, the request processing module 418 performs another iteration of the request processing operations after a predetermined time period has elapsed since the request to perform the operation failed at all of the target servers. In some embodiments, the predetermined time period includes a time at which at least one scheduled health check operation is performed on at least one target server. Thus, these embodiments allow for the possibility that a previously "unhealthy" target server (e.g., a target server who heath metric do not satisfy health criteria) to become healthy again before the next iteration of the request processing operations are performed. In doing so, the pool of target servers may be increased.

FIG. 9 is a flowchart of a method 900 for performing health check operations with respect to target servers, according to some embodiments. For each target server with respect to which the health check operation is to be performed, the health check module 420 periodically performs (902) the health check operation with respect to the target server to update health metrics for the target server. When the health metrics for the target server satisfy the health criteria, the health check module 420 unschedules (904) the health check operation for the target server. In some embodiments, the health check operation is a background operation that is performed independently of the request processing operations.

FIG. 10 is a flowchart of a method for performing (902) a health check operation on a target server to update health metrics for the target server, according to some embodiments. The health check module 420 issues (1002) a health check request to the target server, determines (1004) whether the target server is responding to the health check request, and updates (1006) a server availability metric to indicate whether the target server is available or not available.

Figure 11:
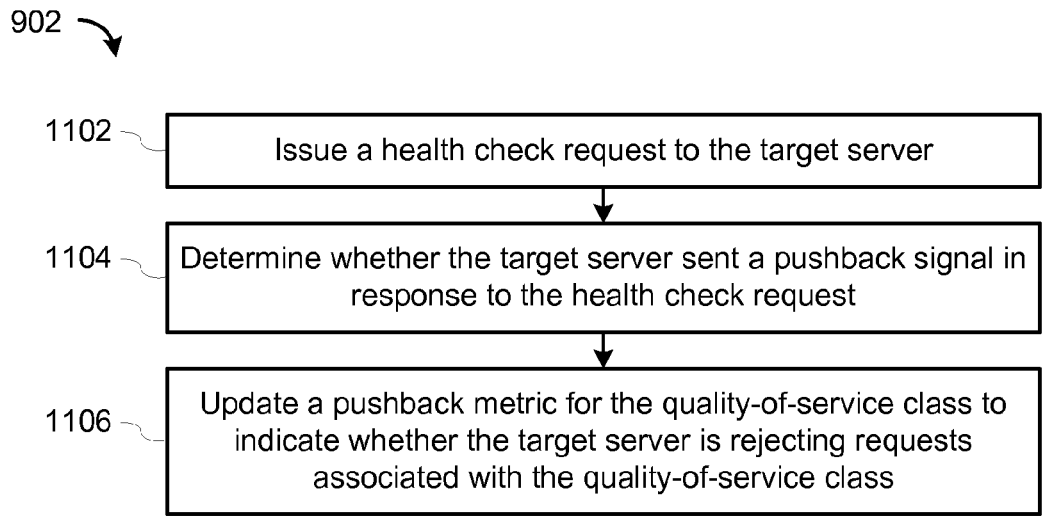
FIG. 11 is a flowchart of another method for performing a health check operation on a target server to update health metrics for the target server, according to some embodiments.

FIG. 11 is a flowchart of a method for performing (902) a health check operation on a target server to update health metrics for the target server, according to some embodiments. The health check module 420 issue (1102) a health check request to the target server, wherein the health check request is associated with a quality-of-service class, determines (1104) whether the target server sent a pushback signal in response to the health check request, and updates (1106) a pushback metric for the quality-of-service class to indicate whether the target server is rejecting requests associated with the quality-of-service class.

Figure 12:
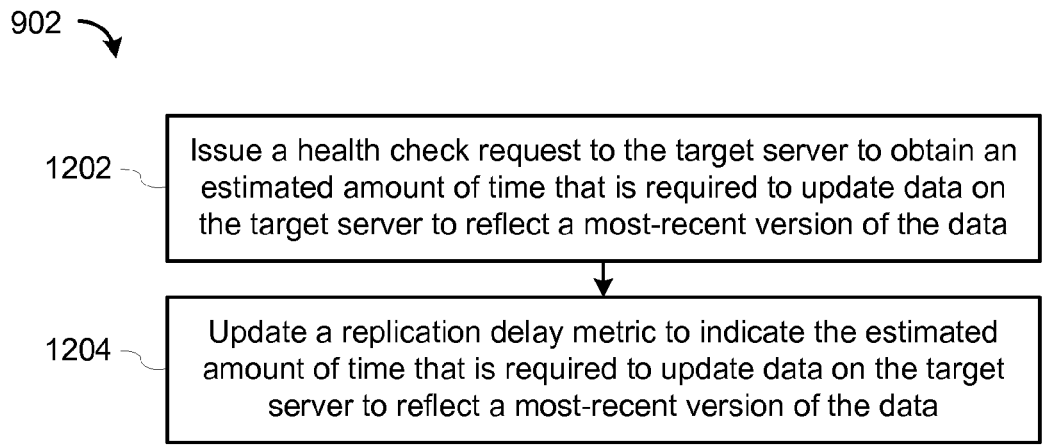
FIG. 12 is a flowchart of another method for performing a health check operation on a target server to update health metrics for the target server, according to some embodiments.

FIG. 12 is a flowchart of a method for performing (902) a health check operation on a target server to update health metrics for the target server, according to some embodiments. The health check module 420 issues (1202) a health check request to the target server to obtain an estimated amount of time that is required to update data on the target server to reflect a most-recent version of the data and updates (1204) a replication delay metric to indicate the estimated amount of time that is required to update data on the target server to reflect a most-recent version of the data.

Note that the operations described with reference to FIGS. 10-12 may be performed in any combination to update multiple health metrics for a target server. In these cases, a single health check request may be issued to update multiple health metrics for the target server.

Note that although the discussion above refers to the request processing module 418 and the health check module 420 performing the operations illustrated in FIGS. 7-12, these operations may be performed by any module (or modules) of the server 102 or any other computer system (e.g., the target servers 104-1 to 104-N, the client computer system 106, etc.).

The methods illustrated in FIGS. 7-12 may be governed by instructions that are stored in a computer readable storage medium and that are executed by at least one processor of at least one server. Each of the operations shown in FIGS. 7-12 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for performing operations on target servers, performed on a server having at least one processor and memory storing at least one program for execution by the at least one processor to perform the method, comprising:

receiving a request including an operation;

identifying a set of target servers associated with the operation;

performing the following request processing operations until a predetermined termination condition has been satisfied:

identifying a target server in the set of target servers to which the request has not been issued and whose health metrics satisfy health criteria;

issuing the request to perform the operation to the target server;

when the request to perform the operation fails at the target server, updating health metrics for the target server to indicate that the request to perform the operation failed at the target server; and scheduling a health check operation to be performed with respect to the target server; and for each target server with respect to which the health check operation is to be performed:

periodically performing the health check operation with respect to the target server to update health metrics for the target server; and when the health metrics for the target server satisfy the health criteria, unscheduling the health check operation for the target server.

2. The computer-implemented method of claim 1, wherein prior to performing the request processing operations, the method includes sorting the target servers in the set of target servers based on network proximity to the server.

3. The computer-implemented method of claim 1, wherein when the request to perform the operation failed at the target server because the target server was not available, updating the health metrics for the target server includes updating a server availability metric of the target server to indicate that the target server is not available.

4. The computer-implemented method of claim 1, wherein when the request to perform the operation failed at the target server because the target server issued a pushback signal for the request, updating the health metrics for the target server includes updating a pushback metric of the target server for a quality-of-service class associated with the request to indicate that the target server rejected the request associated with the quality-of-service class.

5. The computer-implemented method of claim 1, wherein when the request to perform the operation failed at the target server because data associated with the operation to be performed on the target server is not a most-recent version of the data, updating the health metrics for the target server includes updating a replication delay metric of the target server to indicate an estimated amount of time that is required to update the data on the target server to reflect to most-recent version of the data.

6. The computer-implemented method of claim 1, wherein the predetermined termination condition is satisfied when the request to perform the operation succeeds at one of the target severs in the set of target server.

7. The computer-implemented method of claim 1, wherein the predetermined termination condition is satisfied when the request to perform the operation failed at all of the target servers in the set of target servers.

8. The computer-implemented method of claim 1, wherein when the request to perform the operation failed at all of the target servers in the set of target servers, the method includes:
 waiting for a predetermined time period to elapse since the request to perform the operation failed at all of the target servers; and
 repeating the request processing operations.

9. The computer-implemented method of claim 8, wherein the predetermined time period includes a time at which at least one scheduled health check operation is performed on at least one target server.

10. The computer-implemented method of claim 1, wherein performing the health check operation on the target server to update health metrics for the target server includes:
 issuing a health check request to the target server;
 determining whether the target server is responding to the health check request; and
 updating a server availability metric to indicate whether the target server is available or not available.

11. The computer-implemented method of claim 1, wherein performing the health check operation on the target server to update health metrics for the target server includes:
 issuing a health check request to the target server, wherein the health check request is associated with a quality-of-service class;
 determining whether the target server sent a pushback signal in response to the health check request; and
 updating a pushback metric for the quality-of-service class to indicate whether the target server is rejecting requests associated with the quality-of-service class.

12. The computer-implemented method of claim 1, wherein performing the health check operation on the target server to update health metrics for the target server includes:
 issuing a health check request to the target server to obtain an estimated amount of time that is required to update data on the target server to reflect a most-recent version of the data; and
 updating a replication delay metric to indicate the estimated amount of time that is required to update data on the target server to reflect a most-recent version of the data.

13. The computer-implemented method of claim 1, wherein a respective health metric for a respective target server is
 a replication delay metric indicating an estimated amount of time, since a time when a last health check operation was performed with respect to the respective target server, that is required to update data on the respective target server to reflect a most-recent version of the data.

14. The computer-implemented method of claim 1, wherein respective health metrics for a respective target server is stored on the server.

15. The computer-implemented method of claim 1, wherein the health check operation is a background operation that is performed independently of the request processing operations.

16. The computer-implemented method of claim 1, wherein a respective health metric for a respective target server is a respective pushback metric for a respective quality-of-service class indicating whether the respective target server was issuing pushback signals for requests associated with the respective quality-of-service class based on load generated by requests associated with the respective quality-of-service class on the respective server during the last health check operation performed with respect to the respective target server.

17. A system to perform operations on target servers, comprising:
 at least one processor;
 memory; and
 at least one program stored in the memory and executable by the at least one processor, the at least one program comprising instructions to:
 receive a request including an operation;
 identify a set of target servers associated with the operation;
 perform the following request processing operations until a predetermined termination condition has been satisfied:
  identify a target server in the set of target servers to which the request has not been issued and whose health metrics satisfy health criteria;
  issue the request to perform the operation to the target server;
  when the request to perform the operation fails at the target server,
  update health metrics for the target server to indicate that the request to perform the operation failed at the target server; and
  schedule a health check operation to be performed with respect to the target server; and
 for each target server with respect to which the health check operation is to be performed:

periodically perform the health check operation with respect to the target server to update health metrics for the target server; and when the health metrics for the target server satisfy the health criteria, unschedule the health check operation for the target server.

18. The system of claim 17, wherein prior to performing the request processing operations, the at least one program includes instructions to sort the target servers in the set of target servers based on network proximity to the server.

19. A non-transitory computer readable storage medium storing at least one program configured for execution by at least one processor of a computer system, the at least one program comprising instructions to:

receive a request including an operation;

identify a set of target servers associated with the operation; and perform the following request processing operations until a predetermined termination condition has been satisfied:

identify a target server in the set of target servers to which the request has not been issued and whose health metrics satisfy health criteria;

issue the request to perform the operation to the target server;

when the request to perform the operation fails at the target server, update health metrics for the target server to indicate that the request to perform the operation failed at the target server; and schedule a health check operation to be performed with respect to the target server, for each target server with respect to which the health check operation is to be performed:

periodically perform the health check operation with respect to the target server to update health metrics for the target server; and when the health metrics for the target server satisfy the health criteria, unschedule the health check operation for the target server.

20. The non-transitory computer readable storage medium of claim 19, wherein prior to performing the request processing operations, the at least one program includes instructions to sort the target servers in the set of target servers based on network proximity to the server.

\* \* \* \* \*

UNITED STATES PATENT AND TRADEMARK OFFICE
CERTIFICATE OF CORRECTION

PATENT NO. : 9,256,506 B1  
APPLICATION NO. : 13/908996  
DATED : February 9, 2016  
INVENTOR(S) : Taylor et al.

Page 1 of 1

It is certified that error appears in the above-identified patent and that said Letters Patent is hereby corrected as shown below:

In the claims,

Claim 5, column 15, line 29, please delete "reflect to most-recent" and insert --reflect the most-recent--;

Claim 12, column 16, line 13, please delete "reflect a most-recent" and insert --reflect the most-recent--;

Claim 19, column 17, line 17, please delete "tion; and" and insert --tion;--.

Signed and Sealed this  
Third Day of May, 2016

Michelle K. Lee  
*Director of the United States Patent and Trademark Office*